US009820121B2

(12) United States Patent
Sennett et al.

(10) Patent No.: US 9,820,121 B2
(45) Date of Patent: Nov. 14, 2017

(54) PROCESSING WIRELESS EMERGENCY ALERT MESSAGES WITH UNIFORM RESOURCE LOCATORS TO REDUCE CELLULAR NETWORK LOAD

(71) Applicant: AT&T Intellectual Property I, L.P., Atlanta, GA (US)

(72) Inventors: DeWayne A. Sennett, Redmond, WA (US); Brian Kevin Daly, Peachtree Cors, GA (US); Charles Peter Musgrove, Henderson, NV (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 14/969,995

(22) Filed: Dec. 15, 2015

(65) Prior Publication Data

US 2017/0171731 A1    Jun. 15, 2017

(51) Int. Cl.
*H04H 20/59* (2008.01)
*H04W 4/22* (2009.01)
*H04W 4/06* (2009.01)
*H04W 48/18* (2009.01)

(52) U.S. Cl.
CPC ............... *H04W 4/22* (2013.01); *H04W 4/06* (2013.01); *H04W 48/18* (2013.01)

(58) Field of Classification Search
CPC .............. H04N 21/814; H04N 21/4524; H04N 21/6405; H04N 21/654; H04N 21/4383; H04H 20/59; H04H 60/25; H04H 60/51; H04H 20/02; H04H 60/13; G08B 25/016; H04W 4/22; H04W 72/005; H04W 76/007; H04W 4/06
See application file for complete search history.

(56) References Cited

U.S. PATENT DOCUMENTS

| | | | |
|---|---|---|---|
| 7,844,286 B1* | 11/2010 | Sennett | H04W 4/22 370/432 |
| 8,063,766 B2 | 11/2011 | Daly et al. | |
| 8,190,118 B2 | 5/2012 | Sennett et al. | |
| 8,326,260 B1 | 12/2012 | Bradish et al. | |
| 8,660,518 B2 | 2/2014 | Sennett et al. | |
| 8,666,358 B2 | 3/2014 | Qu et al. | |
| 8,825,097 B2 | 9/2014 | Sennett et al. | |
| 8,989,698 B2 | 3/2015 | Fan et al. | |
| 9,071,948 B2 | 6/2015 | Sennett et al. | |
| 9,161,176 B2 | 10/2015 | Alberth, Jr. et al. | |
| 2005/0190747 A1* | 9/2005 | Sindhwani | H04W 88/06 370/352 |
| 2008/0194224 A1 | 8/2008 | Thorson et al. | |
| 2009/0286502 A1* | 11/2009 | Sennett | H04L 12/1895 455/404.1 |
| 2012/0208492 A1 | 8/2012 | Tschofenig et al. | |

(Continued)

*Primary Examiner* — Quan M Hua

(57) ABSTRACT

A method, a mobile device, and a computer-readable medium for accessing target data of a uniform resource locator received in a wireless emergency alert message are disclosed. For example, a method may include a processor for receiving a wireless emergency alert message including a uniform resource locator via a cellular broadcast, determining that a non-cellular access network is available for the mobile device, accessing target data from the uniform resource locator via the non-cellular access network, when the non-cellular access network is available, and presenting the target data on the mobile device.

20 Claims, 3 Drawing Sheets

(56) References Cited

U.S. PATENT DOCUMENTS

| | | |
|---|---|---|
| 2014/0120861 A1 | 5/2014 | Kwak et al. |
| 2014/0269465 A1* | 9/2014 | Ballantyne .............. H04W 4/06 370/311 |
| 2014/0315511 A1 | 10/2014 | Cha et al. |
| 2014/0329490 A1 | 11/2014 | Sennett et al. |
| 2015/0036586 A1 | 2/2015 | Oh et al. |
| 2015/0067727 A1 | 3/2015 | Velazquez |
| 2015/0110255 A1 | 4/2015 | Williams et al. |
| 2015/0140924 A1 | 5/2015 | Marathe et al. |
| 2015/0237489 A1 | 8/2015 | Aoyagi et al. |
| 2015/0296361 A1 | 10/2015 | Sennett et al. |

* cited by examiner

PROCESSING WIRELESS EMERGENCY ALERT MESSAGES WITH UNIFORM RESOURCE LOCATORS TO REDUCE CELLULAR NETWORK LOAD

The present disclosure relates generally to methods, computer-readable media and apparatuses for accessing target data of a uniform resource locator received in a wireless emergency alert message.

BACKGROUND

The Wireless Emergency Alert (WEA) system is capable of providing messages indicative of a variety of types of alerts. Via the WEA system, mobile devices can receive messages pertaining to weather conditions, disasters, child abduction America's Missing: Broadcast Emergency Response (AMBER) alerts, and any alerts for imminent threats to life or property issued by authorized government entities, for example. Due to broadcast capabilities, bandwidth constraints, and limitations of mobile devices (e.g., limited number of characters displayable on the mobile device), the size of the WEA message may be limited, e.g., to 90 characters of alphanumeric text.

SUMMARY

In one example, the present disclosure discloses a method, a computer-readable medium, and an apparatus for accessing target data of a uniform resource locator received in a wireless emergency alert message. For example, a processor of a mobile device may receive a wireless emergency alert message including a uniform resource locator via a cellular broadcast, determine that a non-cellular access network is available for the mobile device, access target data from the uniform resource locator via the non-cellular access network, when the non-cellular access network is available, and present the target data on the mobile device.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
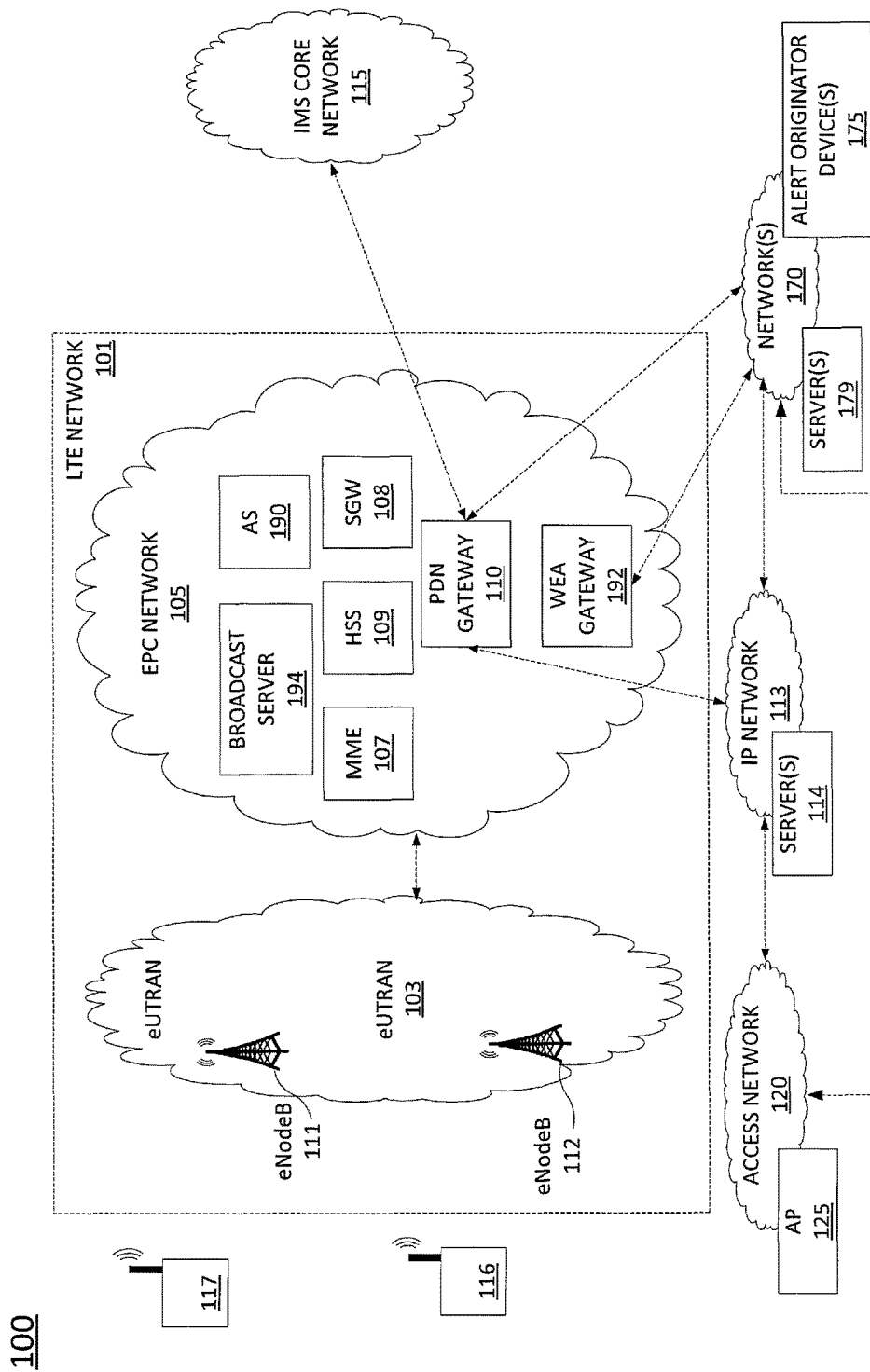
FIG. 1 illustrates an example system related to the present disclosure.

The present disclosure broadly discloses methods, computer-readable media and mobile devices for accessing target data of a uniform resource locator received in a wireless emergency alert message. The Wireless Emergency Alert (WEA) system is a set of network components, protocols, and interfaces that enables authorities to send alerts to mobile devices of a cellular network in a designated alert area. WEA messages, may pertain to such things as geophysical events, such as a landslide, meteorological events, such as windstorms, tornadoes, hurricanes, tsunamis, lightning storms, thunderstorms, hurricanes, freezing rain, blizzards, fog, etc., child abductions, chemical, biological, radiological, nuclear or explosive (CBRNE) threat or attack, or the like.

In general, an authorized alert originator, such as a governmental agency, is responsible for the generation request to broadcast a WEA message and submit the request to a cellular network. The request may include a message content for the WEA message and a designation of an alert area. The request may also include a duration of time for which the alert is applicable and a designation of a category of the alert and/or a specific alert type. For instance, under Federal Communication Commission (FCC) guidelines a WEA message (other than a presidential alert) should include five information elements: an event type, an area affected, a recommended action, an expiration time (with time zone), and a sending agency. In addition, in one example, WEA messages may have a designated maximum size/length of 90 characters of alphanumeric text. For example, 90 characters have been designated as a standard maximum WEA message size by the FCC. In accordance with the present disclosure, and as described in greater detail below, a request to broadcast a WEA message may include alternative or additional information for the message content, e.g., a uniform resource locator (URL).

In one example, after receiving a request to broadcast a WEA message, a cellular network may then broadcast the WEA message via wireless broadcast transmissions from cell towers covering the alert area, e.g., the "area affected" in alerting terminology. In one example, users do not subscribe to WEA messages. Instead, WEA message may be delivered to and received by all mobile devices that are capable of receiving WEA messages within an alert area. In one example, the WEA messages are sent on dedicated broadcast channels to all mobile devices in an alert area. This is in contrast to subscription alerts that comprise point-to-point messages that can cause network congestion issues. In one example, a WEA message may be received by a mobile device, but not presented to the user based upon a configuration of the mobile device and the category or type of WEA message. For instance, a user may elect to not receive AMBER alerts at the user's mobile device.

In one example, the present disclosure comprises a mobile device receiving a WEA message that is broadcast by a cellular network and which includes a uniform resource locator (URL) pointing to additional information. In response to receiving a WEA message that includes a URL, the mobile device may determine whether the mobile device has a non-cellular network connection available (e.g., a wired access network connection, such as a local area network (LAN), a digital subscriber line (DSL) connection, a wireless local area network (WLAN) connection, e.g., Institute of Electrical and Electronics Engineers (IEEE) 802.11 and/or wireless fidelity (Wi-Fi), and so forth) and connecting to the URL to obtain the additional information, when such a non-cellular network connection is available. The mobile device may then present the additional information on the mobile device. Notably, the cellular network is well suited to handle the broadcast of WEA messages, since dedicated broadcast resources are utilized. However, if a large number of mobile devices were to simultaneously attempt to access a URL via the cellular network, the cellular network could be overwhelmed, depending upon the nature and/or size of the target data, the current network load in relevant portions of the cellular network, and so forth. Thus, mobile devices may be configured (e.g., at the operating system or firmware level) to verify that a non-cellular network connection exists before attempting to retrieve the additional information from the URL.

In one example, a WEA message may include alert data and a URL pointing to additional information. Thus, in one example, the alert data of the WEA message may be immediately displayed on the mobile device before or simultaneous with the mobile device determining whether there is a non-cellular connection, accessing the URL, and presenting the additional information. As such, there is no delay in the display of the initial WEA message content (e.g., alert data) to the user. The alphanumeric text of the URL may be presented in addition to the alert data, or may be omitted from display. In one example, the mobile device may also omit displaying the alphanumeric text of the URL if it is determined that there is no non-cellular network connection available. In another example, when it is determined that there is no non-cellular network connection available, the URL may be included with the display of the alert data, but the URL may be presented in text-only form (e.g., in a non-selectable, or non-hyperlink format).

In one example, the URL may be included in a data field of a WEA message according to a format of the WEA message. For instance, in one example, the URL may comprise at least a portion of a "recommended action" field, or other field of the WEA message. In another example, the URL may be included as an additional field of a WEA message format that may be used primarily for inclusion of URLs when desired by alert originators. In one example, the WEA message may maintain conformance with a size limit. For instance, a WEA message may still have a maximum permitted length/size, e.g., 90 characters of alphanumeric text, inclusive of any URL that may be included in such a WEA message. However, in another example, a WEA message may be permitted to exceed a default maximum permitted length/size in order to include a URL. In one example, a link shortener may be used to generate a new, shorter URL that redirects to the target data of an original, longer URL.

In another example, when the mobile device determines that there is a non-cellular network connection available, the mobile device may present the WEA message content including the alert data and the URL, while it is left to the user to select the URL to access the additional information. In one example, a single WEA message may be broadcast both with alphanumeric/text alert data and the URL. In another example, a first WEA message may be broadcast with alphanumeric text only, while a second message related to the first message may be broadcast with the URL. Thus, examples of the present disclosure enable additional information to be provided to and/or accessed by mobile devices in addition to a default WEA message, e.g., 90 characters/alphanumeric text only, when the accessing of such additional information via a URL will not unduly burden the cellular network due to the availability of a non-cellular network connection.

To illustrate, an alert originator may wish to not only provide a warning as to an imminent threat to life or safety, but may also desire to provide additional information for action in response to the threat. Thus, in one example, a portion of the 90 characters of a WEA message content may be used to convey that there is a tornado approaching, to give its current location and trajectory, and to identify the alert generator. The WEA message may also provide a limited recommended action, e.g., "take shelter." In accordance with the present disclosure, the WEA message content may then further include a URL that may link to additional information (target data). For instance, the target data may comprise various types of media, such as a document, an image, a video content, an audio content, and interactive and/or multimedia content, and so forth. To illustrate, in one example the URL may provide access to a text document, a portable document format document, hypertext markup language (HTML) document, e.g., a webpage, or the like, which may include different sets of targeted instructions addressed to recipients who are already indoors, those travelling in vehicles, those who are outside in an urban environment, those who are in open spaces, and so forth. In another example, the target data may comprise a map of an alert area with an evacuation plan illustrated on the map. In still another example, the URL may link to a video that helps describe how to respond to a tornado. If information regarding the event is also being broadcast via radio and television, the target data of the URL may also provide details on an appropriate channel or frequency. For example, if the WEA message is a weather alert originated by the National Weather Service (NWS) of the National Oceanic and Atmospheric Administration (NOAA), the target data of the URL could indicate that further details are available on the NOAA National Weather Alert Radio and indicate the available weather radio channels.

Notably, the cellular network may have capacity to handle the broadcast of the WEA message, by may be overwhelmed by a large number of mobile devices attempting to access the target data of the URL over the cellular network. Thus, examples of the present disclosure help ensure that mobile devices access the target data of the URL via a non-cellular access network, when available. Although some examples may permit mobile devices to access the target data of the URL via the cellular network, it may require substantial and deliberate user action in order to enable the access via the cellular network. For example, the URL may be presented in a non-selectable format (e.g., in a non-hyperlink, plain-text format) along with alert data of the WEA message. However, the user may copy-and-paste or retype the URL into a web browser of the mobile device in order to access the target data. Nevertheless, the number of users who perform these steps may be far less than the total number of recipients of the WEA message. As such, it may be anticipated that this level of activity will result in a lesser probability of overburdening the cellular network.

In this regard, it should be noted that in some cases, the cellular network may indicate that access to the target data of a URL included in a WEA message should not be restricted. For example, the alert area of a WEA message may be a small non-populous area. As such, it may be determined that an anticipated increase in cellular network load could be accommodated, even if all or a substantial portion of the recipients of the WEA messages were to access the target data of the URL via the cellular network. In general, a determination that the cellular network may handle an anticipated increase in network load may be determined from various factors, such as historical network usage data associated with past events and/or past WEA messages, the type of alert and/or the type of threat to which the alert pertains, the time of day, day of week, season, etc., a percentage of recipients for which the mobile devices have non-cellular access networks available, the type of target information of the URL, e.g., a document of less than 100 kilobytes may be anticipated to generate a relatively small load as compared to a ten minute video comprising many megabytes, and so on. In one example, the cellular network may indicate a permission to deviate from operations of the present disclosure (i.e., first verifying a non-cellular access network is available before accessing target data of a URL) by including a signal in the WEA message, or in a separate message. For example, a special character may be included in the first position or last position of the WEA message, or in a field of the WEA message, to indicate a permission to disregard operations of the present disclosure. Thus, in some situations, mobile devices may be permitted by the cellular network operator to access target data of the URL via the cellular network, without first verifying a non-cellular access network is available.

As such, in accordance with the present disclosure, a network operator may provide enhanced services to WEA message originators and recipients in selected instances, while at the same time maintaining the integrity of the network infrastructure. For example, it is undesirable for a WEA message to cause an overload of the network such that users who need to make 911 emergency calls are unable to do so. Therefore, the present disclosure balances the benefits of delivering as much relevant information as possible via a WEA message and via target data of a URL contained in the WEA message, while at the same time ensuring that the network remains operational. These and other aspects of the present disclosure are described in greater detail below in connection with the discussion of FIGS. 1-3.

To better understand the present disclosure, FIG. 1 illustrates an example network, or system 100 suitable for implementing embodiments of the present disclosure for accessing target data of a uniform resource locator received in a wireless emergency alert message. In one example, the system 100 comprises a cellular network, e.g., a Long Term Evolution (LTE) network 101, an IP network 113, and a core network 115, e.g., an IP Multimedia Subsystem (IMS) core network 115. In one example, LTE network 101 and IMS core network 115 may be provided and operated by a same cellular network operator. FIG. 1 also illustrates various user endpoint devices, e.g., mobile devices 116 and 117. The mobile devices 116 and 117 may each comprise a cellular telephone, a smartphone, a tablet computing device, a laptop computer, a pair of computing glasses, a wireless enabled wristwatch, or any other mobile telephony and computing device equipped for both cellular and non-cellular communications, (broadly, "mobile devices").

In one example, the LTE network 101 comprises an access network, e.g., an evolved Universal Terrestrial Radio Access Network (eUTRAN) 103 and a core network, e.g., an Evolved Packet Core (EPC) network 105. The eUTRANs are the air interfaces of the $3^{rd}$ Generation Partnership Project (3GPP) LTE specifications for mobile networks. In one example, EPC network 105 provides various functions that support wireless services in the LTE environment. For instance, EPC network 105 may comprise an Internet Protocol (IP) packet core network that supports both real-time and non-real-time service delivery across LTE network 101, e.g., as specified by the 3GPP standards. In one example, eNodeBs 111 and 112 in the access network 103 are in communication with the EPC network 105. The eNodeBs may comprise LTE components that are similar to cellular base stations or base transceiver stations (BTSs) in cellular access networks employing pre-LTE and/or non-LTE architectures. In operation, LTE user equipment, e.g., mobile devices 116 and 117 may access cellular wireless services via the eNodeBs 111 and 112 located in the access network 103. It should be noted that any number of eNodeBs can be deployed in eUTRAN 103.

In EPC network 105, network devices Mobility Management Entity (MME) 107 and Serving Gateway (SGW) 108 support various functions as part of the LTE network 101. For example, MME 107 is the control node for the LTE access network, e.g., eUTRAN 103. In one embodiment, MME 107 is responsible for UE (User Equipment) tracking and paging (e.g., such as retransmissions), bearer activation and deactivation process, selection of the SGW, and authentication of a user. In one embodiment, SGW 108 routes and forwards user data packets, while also acting as the mobility anchor for the user plane during inter-eNodeB handovers and as the anchor for mobility between LTE and other wireless technologies, such as 2G and 3G wireless networks.

In addition, EPC network 105 may comprise a common backbone including a Home Subscriber Server (HSS) 109 that contains subscription-related information (e.g., subscriber profiles), performs authentication and authorization of a subscriber's mobile device, and provides information about the mobile device's location. The EPC network 105 may also comprise a public data network (PDN) gateway 110 which serves as a gateway that provides access between the EPC network 105 and various data networks, e.g., another IP network 113, an IMS core network 115, and the like. In one example, IP network 113 may comprise the Internet in general. The public data network gateway is also referred to as a PDN gateway, a PDN GW or a PGW.

The EPC network 105 may also include an application server (AS) 190. In one embodiment, AS 190 may comprise a computing system, such as computing system 300 depicted in FIG. 3, and may be configured to provide one or more functions and/or to performing various operations in accordance with the present disclosure. Accordingly, the AS 190 may be connected directly or indirectly to any one or more network elements of EPC network 105, and of the system 100 in general, that are configured to gather and forward network analytic information, such as signaling and traffic data, and other information and statistics to AS 190 and to receive instructions from AS 190. In addition, AS 190 may be configured to receive requests to broadcast WEA messages from alert originator devices 175 deployed in one or more alert originating networks 170, each of which may be associated with an authorized alert originator. For example, one or more of the alert originator devices 175 may comprise all or a portion of a Federal Emergency Management Administration (FEMA) Integrated Public Alert and Warning System (IPAWS).

In one example, AS 190 may receive a request to broadcast a WEA message from one of the alert originator devices 175 that includes alert data, e.g., alphanumeric text information, and a URL that provides a link to additional information associated with the WEA message. For example, an alert originator may wish to not only provide a warning as to an imminent threat to life or safety, but may also desire to provide additional information for action in response to the threat that is either in non-text format, or that would not fit within a WEA message format. For instance, the alert originator may have text that exceeds 90 characters, or a map, a video, and so forth that the alert originator would like to provide to target recipients of the WEA message. Thus, the additional information may be provided as target data of a URL that enables mobile devices of the recipients to access the target data by following the URL.

In one example, the URL may link to one or more servers storing the target data. For instance, the target data may be stored by the alert originator or another party on one of the servers 179 in one of the networks 170. In such case, the URL may provide a link to access the target data on the one of the servers 179. In another example, the URL may link to one of servers 114 deployed in and/or accessible via IP network 113 that stores the target data. In still another example, the target data may be stored in a device within EPC core network 105 or IMS core network 115. For instance, a telecommunications service provider operating LTE network 101 and/or IMS core network 115 may provide a service to alert originators for storing target data of URLs included in WEA messages.

In one example, AS 190 may also be configured to broadcast WEA messages to mobile devices being served by wireless access networks in an alert area, such as mobile devices 116 and 117. For example, AS 190 may confirm that a message content for the WEA message and other aspects of the request, such as the time duration, the alert area, and so forth, conform to various requirements and then provide the WEA message to a broadcast server 194. The broadcast server 194 may provide the WEA message to eNodeB 111, eNodeB 112, and/or other eNodeBs, or similar access network components to be broadcast to mobile devices that are being serviced by the cells of the alert area. In various examples, AS 190 may alternatively or additionally be referred to as a cell broadcast center (CBC), an emergency alert server (EAS), or a WEA server. In one example, AS 190 may be deployed in a network operations center (NOC) of a cellular network operator, e.g., an entity operating the EPC network 105, LTE network 101, eUTRAN 103, and so on. Due to the relatively large number of connections available between AS 190 and other network elements, none of the actual links to the application server are shown in FIG. 1. Similarly, links between MME 107, SGW 108, broadcast server 194, eNodeBs 111 and 112, PDN gateway 110, and other components of system 100 are also omitted for clarity.

In still another example, system 100 may be configured such that communications between alert originator devices 175 and AS 190 may bypass PDN gateway 110, and other components. For instance, dedicated gateways and network connections that are not shared with other external entities may be provided for guaranteeing access by alert originators devices 175 to AS 190. For example, a WEA gateway 192 may be included as a point of ingress to and egress from EPC network 105 for communications between alert originator devices 175 in WEA networks 170 and AS 190 in EPC network 105. Such a WEA gateway 192 may alternatively be referred to as a commercial mobile service provider (CMSP) gateway or a commercial mobile alert system (CMAS) gateway.

As mentioned above, the broadcast server 194 may provide WEA message to eNodeB 111, eNodeB 112, and/or other eNodeBs, or similar access network components to be broadcast to mobile devices that are being serviced by the cells of an alert area. In the example of FIG. 1, one or more WEA messages may be broadcast from both eNodeBs 111 and 112 and received by mobile devices 116 and 117 relating to an emergency. For instance, in one example, a first WEA message may be sent with alert data, followed by another WEA message with a URL linking to target data with additional information regarding the emergency. In another example, a single WEA message may be broadcast from eNodeBs 111 and 112 that may include both alert data and a URL linking to target data with additional information regarding the emergency.

Figure 2:
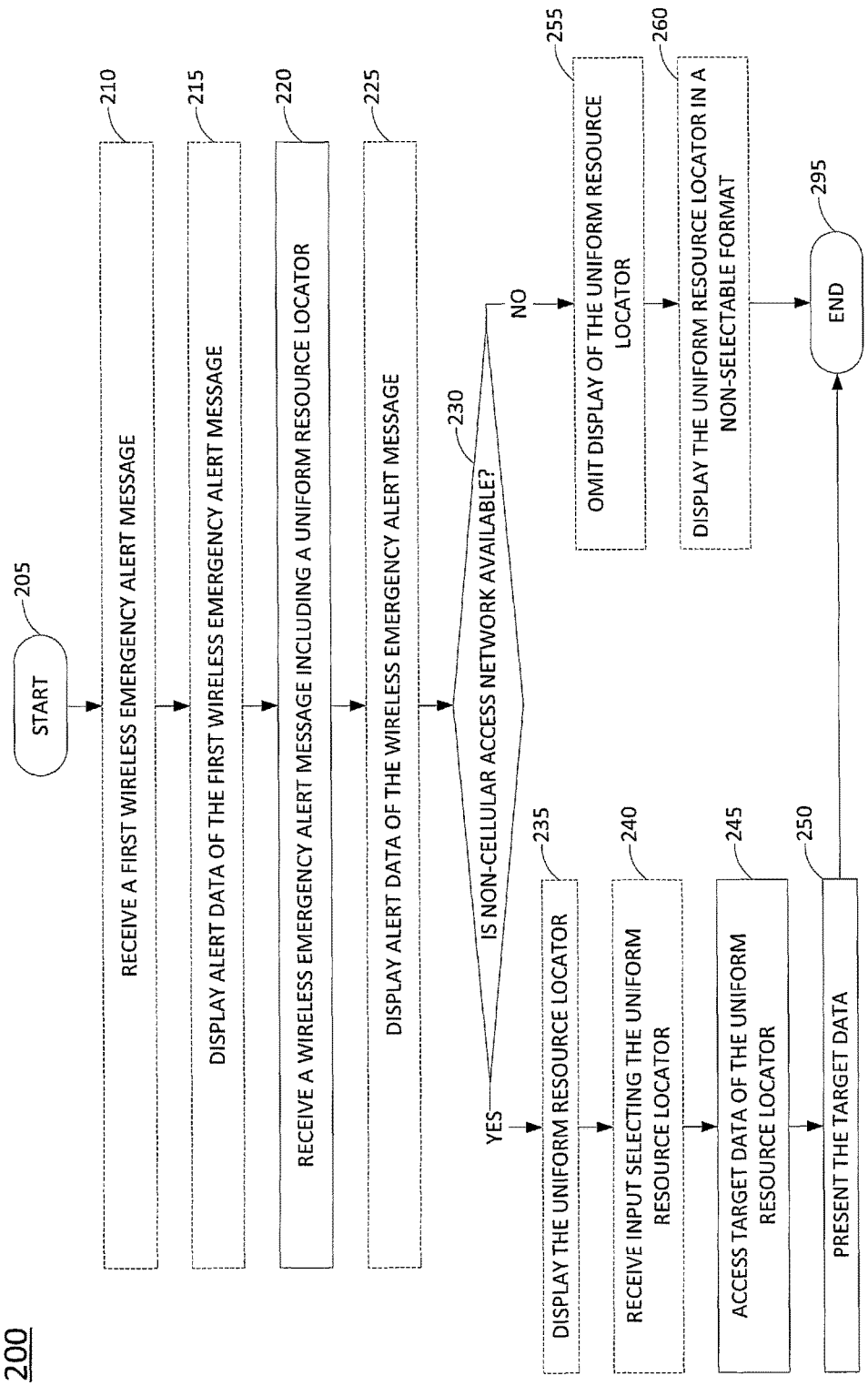
FIG. 2 illustrates a flowchart of an example method for accessing target data of a uniform resource locator received in a wireless emergency alert message, according to the present disclosure.
Figure 3:
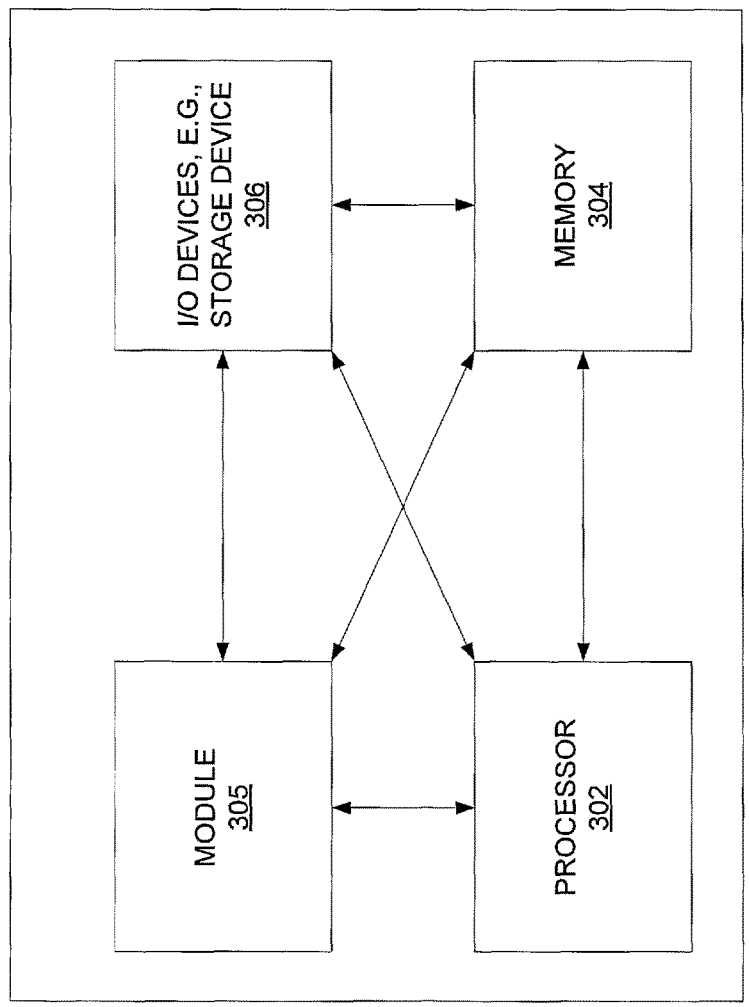
FIG. 3 illustrates a high-level block diagram of a computing device specially configured to perform the functions, methods, operations and algorithms described herein.

In one example, mobile devices 116 and 117 may each comprise a computing system, such as computing system 300 depicted in FIG. 3, and may be configured to provide one or more functions and/or to perform various operations in accordance with the present disclosure. For example, mobile devices 116 and 117 may perform operation of the example method of FIG. 2, discussed in greater detail below. In one example, mobile devices 116 and 117 may each display alert data from a WEA message. In addition, mobile devices 116 and 117 may each determine whether a non-cellular access network is available (e.g., a wired or wireless local access network connection, and so forth). Thus, in one example, the alert data of the WEA message may be immediately displayed on the mobile device before or simultaneous with the mobile device determining whether there is a non-cellular access network. As such, there is no delay in the display of initial WEA message content (e.g., alert data) to the users.

In the example of FIG. 1, mobile device 116 may be located near non-cellular access network 120 and detects a connection to access point (AP) 125, e.g., a wireless router. As such, mobile device 116 may present the URL in a hyperlink format for selection by a user of the mobile device 116, or may automatically follow the URL to access the target data of the URL. For instance, the URL may cause mobile device 116 to access target data stored on one of servers 179 in one of the networks 170 via access network 120 and/or via IP network 113. Upon accessing the target data, mobile device 116 may then present the target data, e.g., using a display, a speaker, or other output component of the mobile device 116.

On the other hand, in the same example, mobile device 117 may not detect a connection to a non-cellular access network. As such, mobile device 117 may display the alert data alone (e.g., without displaying the URL) or may display the URL in a non-selectable formal (e.g., in a non-hyperlink, text-only format) along with the alert data. Thus, the mobile devices 116 and 117 may be configured (e.g., at the operating system or firmware level) to verify that a non-cellular network connection exists before attempting to retrieve the target data of the URL. The operations of an example mobile device in response to receiving one or more WEA messages is described in greater detail below in connection with the example method 200 of FIG. 2.

The foregoing description of the system 100 is provided as an illustrative example only. In other words, the example of system 100 is merely illustrative of one network configuration that is suitable for implementing embodiments of the present disclosure. As such, other logical and/or physical arrangements for the system 100 may be implemented in accordance with the present disclosure. For example, AS 190, broadcast server 194 and/or other network components may be deployed in the IMS core network 115 instead of being deployed within the EPC network 105, or in other portions of system 100 that are not shown, while providing essentially the same functionality. Various elements of access network 103 and EPC network 105 are also omitted for clarity, including gateways or border elements providing connectivity between such networks.

In addition, although aspects of the present disclosure have been discussed above in the context of a long term evolution (LTE)-based wireless network, examples of the present disclosure are not so limited. Thus, the teachings of the present disclosure can be applied to other types of wireless networks (e.g., 2G network, 3G network and the like), for use in connection with broadcasting WEA messages and for mobile devices accessing target data of a URL received in a WEA message. Thus, these and other modifications are all contemplated within the scope of the present disclosure.

FIG. 2 illustrates a flowchart of an example method 200 for accessing target data of a uniform resource locator (URL) received in a wireless emergency alert (WEA) message. In one embodiment, the steps, operations or functions of the method 200 may be performed by any one or more of the components of the system 100 depicted in FIG. 1. For example, in one embodiment, the method 200 is performed by one of mobile devices 116 or 117. In another embodiment, the method 200 is performed by a mobile device in coordination with other components of the system 100, such as WEA gateway 192, broadcast sever 194, eNodeBs 111 and 112, and so forth. Alternatively, or in addition, one or more steps, operations or functions of the method 200 may be implemented by a computing device having a processor, a memory and input/output devices as illustrated below in FIG. 3, specifically programmed to perform the steps, functions and/or operations of the method. Although any one of the elements in system 100 of FIG. 1 may be configured to perform various steps, operations or functions of the method 200, the method will now be described in terms of an embodiment where steps of the method are performed by a processor, such as processor 302 in FIG. 3. For example, the processor may comprise a processor of a mobile device that is equipped for both cellular and non-cellular communications.

The method 200 begins in step 205 and may proceed to optional step 210 or to step 220. In optional step 210, the processor may receive a first WEA message that may include alert data. For instance, the alert data may comprise alphanumeric text conveying basic information regarding an imminent threat to life or property. In one example, the first WEA message is received from a cellular network via a cellular broadcast over a broadcast channel. For example, the WEA message may be broadcast by one or more eNodeB's and/or base stations in an alert area for reception by all cellular-capable mobile devices within communication range. In one example, the alert data may conform to a WEA message format, e.g., 90 characters of alphanumeric text.

At optional step 215, the processor may display the alert data of the first WEA message. For instance, the processor may comprise a processor of a mobile device. In addition, the alert data may comprise alphanumeric text. Therefore, the processor may display the alert data on a display screen of the mobile device at optional step 215.

At step 220, the processor receives a WEA message that includes a uniform resource locator (URL). In one example, the WEA message is received from the cellular network via a cellular broadcast over a broadcast channel. The WEA message received at step 220 may comprise a different WEA messages from the first WEA message that may be received at optional step 210. For instance, in one example, an alert originator and/or a cellular network operator may provide the first WEA message with basic text information regarding an emergency, while another WEA message may follow that contains a URL for accessing target data comprising additional information regarding the emergency. However, in another example, a single WEA message received at step 220 may include both alert data and a URL for accessing additional information regarding the emergency. In such case, optional steps 210 and 215 may be omitted.

In any event, the WEA message received at step 220 may include a URL for accessing target data comprising additional information regarding the emergency. For instance, the target data may comprise a document, an image, a video content, an audio content, and so forth. In one example, the URL is for accessing a server or other network-based devices that store the target data and for retrieving the target data from the storage location. In one example, the WEA message received at step 220 (as well as the WEA message that may be received at optional step 210) may comprise multiple data fields that may include: an event type, an area affected, a recommended action, an expiration time (with time zone), a sending agency, and so forth. In one example, the "alert data" may comprise the information contained in all or a portion of this set of data fields. In addition, in one example, the URL may be included in a data field of a WEA message according to a format of the WEA message. For instance, in one example, the URL may comprise at least a portion of a "recommended action" field, or other field of a WEA message. In another example, the WEA message may be in accordance with a WEA message format that includes a field assigned exclusively or primarily for conveying URLs.

Following step 220, the method 200 may proceed to optional step 225 or to step 230. At optional step 225, the processor may display alert data of the WEA message received at step 220. For example, if alert data is included in the same WEA message as the URL, the alert data may be presented immediately, e.g., upon receipt of the WEA message and subject to any non-intentional delays, such as closing or interrupting other applications running on the mobile device, and so forth, and/or prior to the processor performing additional steps, functions or operations of the method 200. As such, there is no delay in the display of the initial WEA message content (e.g., alert data) to the user of the mobile device.

At step 230, the processor determines whether a non-cellular access network is available to the mobile device. For instance, as mentioned above, the processor may comprise a processor of a mobile device that is equipped for both cellular and non-cellular communications. Thus, the processor may receive a WEA message that is broadcast by components of a cellular network. However, as mentioned above, if a large number of mobile devices were to simultaneously attempt to access a URL via the cellular network, the cellular network could be overwhelmed, depending upon the nature and/or size of the target data, the current network load in relevant portions of the cellular network, and so forth. As such, at step 230, the processor may first determine whether a non-cellular access network is available, e.g., for accessing the target data of the URL via the non-cellular access network. The determination of whether a non-cellular access network is available may comprise verifying that components of the non-cellular access network acknowledge the mobile device. For instance, the processor may confirm that an Internet Protocol (IP) address assigned to the mobile device remains valid. In another example, the processor may request an IP address assignment from a dynamic host configuration protocol (DHCP) server, which if successful, may confirm the availability of the non-cellular access network. In one example, step 230 may comprise sensing a sufficient signal strength from an access point in a wireless local area network. Thus, the determination of whether a non-cellular access network is available may take various forms depending upon the capabilities of the mobile device and the network(s) and environment(s) in which the mobile device is deployed.

When the processor determines that a non-cellular access network is available, the method 200 may proceed to optional step 235 or to step 245.

At optional step 235, the processor may display the URL on the mobile device for selection by the user. For instance, a cellular network operator, a mobile device manufacturer, and/or the user of the mobile device may configure the processor and/or the mobile device to not automatically follow the URL to obtain the target data via the non-cellular access network, but to instead present the URL in a selectable format, e.g., as a hyperlink, or by presenting a dialog box, button, or other user interface for requesting a user input prior to accessing the URL.

At optional step 240, the processor may receive a user input selecting the URL. For instance, the user input may comprise a tapping on a touch display screen where the URL is displayed or where a button is presented, a voice command to follow the URL, a keyboard or a keypad entry, and so forth. The nature of the input received at optional step 240 may depend upon the user interface capabilities of the mobile device, network operator permissions, customizations and/or configurations of the mobile device by the user, and so forth.

At step 245, the processor accesses target data of the URL. For example, the processor may instantiate a session with a server or other network-based component via the non-cellular access network and/or one or more additional intermediary networks in order to request and retrieve the target data of the URL. For instance, the processor may generate a hypertext transfer protocol (HTTP) request comprising the URL to retrieve the target data from an HTTP server hosting the target data. The accessing of the target data may utilize any one or more client/server and/or network communication protocols in order to access the target data. Thus, the present disclosure is not limited to HTTP communications, but may implement, for example, file transfer protocol (FTP), trivial file transfer protocol (TFTP), secure shell (SSH) file transfer protocol (SFTP), real time streaming protocol (RTSP), and so on.

At step 250, the processor presents the target data of the URL that is accessed at step 245 on the mobile device. This may include a visual display output, an audio output, and so forth. The presentation of the target data may vary depending upon the nature or the target data and/or the output capabilities of the mobile device, network operator permissions, customizations and/or configurations of the mobile device by the user, and so forth. For instance, if the target data comprises a map, step 250 may include rendering the map on a display of the mobile device. If the target data comprises audio instructions, step 250 may comprise playing the audio instructions via a speaker or a headset of the mobile device, or via a similar component that is attached or connected to the mobile device, and so forth. Following step 250, the method 200 proceeds to step 295 where the method ends.

Returning to a discussion of step 230, if at step 230 the processor determines that a non-cellular access network is not available, the method 200 may proceed to optional step 255 or to optional step 260.

At optional step 255, the processor may omit display of the URL contained in the WEA message received at step 220. For instance, the processor may present only the alert data contained in the WEA message received at step 220 or contained in the first WEA message that may be received at optional step 210 in response to receiving the WEA message(s). Following optional step 255, the method 200 may proceed to step 295 where the method ends.

At optional step 260, the processor may display the URL in a non-selectable format. For instance, the URL may be presented in a plain-text and/or a non-hyperlink format on the mobile device. In one example, the URL may be presented in the non-selectable format along with or following alert data that is contained in the WEA message received at step 220 or the first WEA message that may be received at optional step 210. Thus, the user of the mobile device may not be completely foreclosed from accessing the target data of the URL via the cellular network. However, it may require substantial and deliberate user action such as copying-and-pasting or retyping the URL into a web browser of the mobile device in order to access the target data. Nevertheless, the number of users who perform these steps may be far less than the total number of recipients of the WEA message. As such, it may be anticipated that this level of activity will result in lesser probability of overburdening the cellular network. In one example, the processor and/or the mobile device may be configured to alternatively perform one of optional steps 255 or 260 based upon a preference of an operator of the cellular network. Following optional step 260, the method 200 may proceed to step 295 where the method ends.

In addition, although not specifically specified, one or more steps, functions or operations of the method 200 may include a storing, displaying and/or outputting step as required for a particular application. In other words, any data, records, fields, and/or intermediate results discussed in the method 200 can be stored, displayed, and/or outputted either on the device executing the respective method or to another device, as required for a particular application. Furthermore, steps, blocks, functions, or operations in FIG. 2 that recite a determining operation or involve a decision do not necessarily require that both branches of the determining operation be practiced. In other words, one of the branches of the determining operation can be deemed as an optional step. Moreover, steps, blocks, functions, or operations of the above described method 200 can be combined, separated, omitted, and/or performed in a different order from that described above, without departing from the examples of the present disclosure.

As such, the present disclosure provides at least one advancement in the technical field of cellular wireless emergency alert (WEA) message processing. In particular, in one example, the present disclosure enables a network operator to provide enhanced services to alert originators and WEA message recipients in selected instances, while at the same time maintaining the integrity of the network infrastructure. For example, it is undesirable for a WEA message to cause an overload of the network such that users who need to make 911 emergency calls are unable to do so. Therefore, the present disclosure balances the benefits of delivering as much relevant information as possible via one or more WEA messages and via target data of a URL contained in the WEA message, while at the same time ensuring that the network remains operational. The present disclosure also provides a transformation of data. For example, network analytic data, e.g., data regarding whether or not a non-cellular access network is available, may be transformed into data comprising a determination as to whether accessing of target data of a URL contained in a WEA message is to be permitted.

Examples of the present disclosure also improve the functioning of a computing device, e.g., a mobile device. Namely, a new type of mobile device and/or components of a mobile device for selectively accessing target data of a URL received in a WEA message are provided. For example, a mobile device of the present disclosure may receive a WEA message including a URL via a cellular broadcast, determine that a non-cellular access network is available for the mobile device, access target data from the URL via the non-cellular access network, when the non-cellular access network is available, and present the target data on the mobile device. Notably, no previous mobile device has performed these functions as described herein.

For example, previous mobile devices may simply receive a WEA message comprising alphanumeric text only.

In addition, an improved cellular network is provided in examples of the present disclosure. For instance, a new cellular network of the present disclosure may enable alert originators to send WEA messages containing URLs that provide access to target data comprising additional information regarding an emergency, such as images, video, audio, and so forth, while at the same time, the cellular network is protected from overload conditions that may otherwise arise as a result of mobile devices automatically accessing the target data of the URLs over the cellular network infrastructure.

FIG. 3 depicts a high-level block diagram of a computing device suitable for use in performing the functions described herein. As depicted in FIG. 3, the system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for accessing target data of a uniform resource locator received in a wireless emergency alert message, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the method, or the entire method is implemented across multiple or parallel computing devices, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The one or more hardware processors 302 can also be configured or programmed to cause other devices to perform one or more operations as discussed above. In other words, the one or more hardware processors 302 may serve the function of a controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method 200 discussed above can be used to configure a hardware processor to perform the steps, functions and/or operations of the above disclosed methods. In one embodiment, instructions and data for the present module or process 305 for accessing target data of a uniform resource locator received in a wireless emergency alert message (e.g., a software program comprising computer-executable instructions) can be loaded into memory 304 and executed by hardware processor element 302 to implement the steps, functions or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer-readable or software instructions relating to the above described methods can be perceived as a programmed processor or a specialized processor. As such, the present module 305 for accessing target data of a uniform resource locator received in a wireless emergency alert message (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method comprising:
receiving, by a processor of a mobile device, a first wireless emergency alert message, wherein the first wireless emergency alert message comprises alert data;
displaying, by the processor, the alert data on the mobile device;
receiving, by the processor, a second wireless emergency alert message including a uniform resource locator via a cellular broadcast, wherein the second wireless emergency alert message is received after the first wireless emergency alert message;
determining, by the processor, whether a non-cellular access network is available for the mobile device; and
in response to determining that the non-cellular access network is available,
accessing, by the processor, target data using the uniform resource locator via the non-cellular access network; and
presenting, by the processor, the target data on the mobile device, wherein the target data is presented after the alert data is displayed; and
in response to determining that the non-cellular access network is not available,
displaying, by the processor, the uniform resource locator on the mobile device in a non-selectable format.

2. The method of claim 1, further comprising:
determining that the second wireless emergency alert message includes the uniform resource locator.

3. The method of claim 2, wherein the determining whether the non-cellular access network is available is performed in response to determining that the second wireless emergency alert message includes the uniform resource locator.

4. The method of claim 1, wherein the alert data is displayed on the mobile device with the uniform resource locator in the non-selectable format in response to the determining that the non-cellular access network is not available.

5. A mobile device comprising:
   a processor; and
   a computer-readable medium storing instructions which, when executed by the processor, cause the processor to perform operations comprising:
      receiving a first wireless emergency alert message, wherein the first wireless emergency alert message comprises alert data;
      displaying the alert data on the mobile device;
      receiving a second wireless emergency alert message including a uniform resource locator via a cellular broadcast, wherein the second wireless emergency alert message is received after the first wireless emergency alert message;
      determining whether a non-cellular access network is available for the mobile device; and
      in response to determining that the non-cellular access network is available,
         accessing target data using the uniform resource locator via the non-cellular access network; and
         presenting the target data on the mobile device, wherein the target data is presented after the alert data is displayed; and
      in response to determining that the non-cellular access network is not available,
         displaying the uniform resource locator on the mobile device in a non-selectable format.

6. The mobile device of claim 5, wherein the operations further comprise:
   determining that the second wireless emergency alert message includes the uniform resource locator.

7. The mobile device of claim 6, wherein the determining whether the non-cellular access network is available is performed in response to determining that the second wireless emergency alert message includes the uniform resource locator.

8. A non-transitory computer-readable medium storing instructions which, when executed by a processor of a mobile device, cause the processor to perform operations, the operations comprising:
   receiving a first wireless emergency alert message, wherein the first wireless emergency alert message comprises alert data;
   displaying the alert data on the mobile device;
   receiving a second wireless emergency alert message including a uniform resource locator via a cellular broadcast, wherein the second wireless emergency alert message is received after the first wireless emergency alert message;
   determining whether a non-cellular access network is available for the mobile device; and
   in response to determining that the non-cellular access network is available,
      accessing target data using the uniform resource locator via the non-cellular access network; and
      presenting the target data on the mobile device, wherein the target data is presented after the alert data is displayed; and
   in response to determining that the non-cellular access network is not available,
      displaying the uniform resource locator on the mobile device in a non-selectable format.

9. The non-transitory computer-readable medium device of claim 8, wherein the alert data is displayed on the mobile device with the uniform resource locator in the non-selectable format in response to the determining that the non-cellular access network is not available.

10. The mobile device of claim 5, wherein the alert data is displayed on the mobile device with the uniform resource locator in the non-selectable format in response to the determining that the non-cellular access network is not available.

11. The non-transitory computer-readable medium of claim 8, the operations further comprising:
   determining that the second wireless emergency alert message includes the uniform resource locator.

12. The non-transitory computer-readable medium of claim 11, wherein the determining whether the non-cellular access network is available is performed in response to determining that the second wireless emergency alert message includes the uniform resource locator.

13. The non-transitory computer-readable medium of claim 8, the operations further comprising:
   in response to the determining that the non-cellular access network is available:
      displaying the uniform resource locator on the mobile device in a selectable format;
      receiving a selection of the uniform resource locator; and
      wherein the accessing of the target data using the uniform resource locator via the non-cellular access network is in response to a receipt of the selection.

14. The non-transitory computer-readable medium of claim 13, wherein the displaying the uniform resource locator on the mobile device in the selectable format comprises displaying the uniform resource locator as at least one of: a hyperlink, a dialog box, a button, or a user interface for requesting a user input.

15. The method of claim 1, further comprising:
   in response to the determining that the non-cellular access network is available:
      displaying the uniform resource locator on the mobile device in a selectable format;
      receiving a selection of the uniform resource locator; and
      wherein the accessing of the target data using the uniform resource locator via the non-cellular access network is in response to a receipt of the selection.

16. The method of claim 15, wherein the displaying the uniform resource locator on the mobile device in the selectable format comprises displaying the uniform resource locator as at least one of: a hyperlink, a dialog box, a button, or a user interface for requesting a user input.

17. The method of claim 1, wherein the alert data of the first wireless emergency alert message comprises an alphanumeric text.

18. The mobile device of claim 5, wherein the operations further comprise:
   in response to the determining that the non-cellular access network is available:
      displaying the uniform resource locator on the mobile device in a selectable format;
      receiving a selection of the uniform resource locator; and wherein the accessing of the target data using the uniform resource locator via the non-cellular access network is in response to a receipt of the selection.

19. The mobile device of claim 18, wherein the displaying the uniform resource locator on the mobile device in the selectable format comprises displaying the uniform resource locator as at least one of: a hyperlink, a dialog box, a button, or a user interface for requesting a user input.

20. The mobile device of claim 5, wherein the alert data of the first wireless emergency alert message comprises an alphanumeric text.

* * * * *